(12) United States Patent
Knittl

(10) Patent No.: US 7,408,452 B2
(45) Date of Patent: Aug. 5, 2008

(54) WIRELESS WHEEL SPEED SENSOR

(75) Inventor: Peter Knittl, Kelheim (DE)

(73) Assignee: Infineon Technologies AG, Munich (DE)

( * ) Notice: Subject to any disclaimer, the term of this patent is extended or adjusted under 35 U.S.C. 154(b) by 254 days.

(21) Appl. No.: 11/257,251

(22) Filed: Oct. 24, 2005

(65) Prior Publication Data

US 2007/0090934 A1   Apr. 26, 2007

(51) Int. Cl.
*B60Q 1/00* (2006.01)
*B60K 28/16* (2006.01)

(52) U.S. Cl. .............. 340/441; 340/438; 340/444; 340/447; 340/440; 180/197; 180/282; 701/38

(58) Field of Classification Search .......... 340/441, 340/444

See application file for complete search history.

(56) References Cited

U.S. PATENT DOCUMENTS

| | | | |
|---|---|---|---|
| 6,271,748 B1 * | 8/2001 | Derbyshire et al. | 340/442 |
| 6,278,363 B1 | 8/2001 | Bezek et al. | |
| 6,405,132 B1 * | 6/2002 | Breed et al. | 701/301 |
| 6,748,797 B2 | 6/2004 | Breed et al. | |
| 7,046,131 B2 * | 5/2006 | Todorox | 340/444 |
| 7,104,123 B2 * | 9/2006 | Stewart et al. | 73/146.5 |
| 2002/0126005 A1 * | 9/2002 | Hardman et al. | 340/442 |
| 2002/0130771 A1 * | 9/2002 | Osborne et al. | 340/438 |
| 2004/0150516 A1 * | 8/2004 | Faetanini | 340/444 |
| 2004/0215382 A1 | 10/2004 | Breed et al. | |

FOREIGN PATENT DOCUMENTS

| | | |
|---|---|---|
| EP | 0 867 826 A2 | 9/1998 |
| EP | 1 281 934 | 2/2003 |
| EP | 1 342 633 | 9/2003 |
| JP | 2002-193083 | 7/2002 |
| WO | 02/20287 A1 | 3/2002 |
| WO | 02/47924 | 6/2002 |

OTHER PUBLICATIONS

International Search Report, Int'l Application No. PCT/EP2006/010251, Int'l Filing Date Oct. 24, 2006, 3 pgs.

* cited by examiner

*Primary Examiner*—Donnie L. Crosland
(74) *Attorney, Agent, or Firm*—Eschweiler & Associates, LLC

(57) ABSTRACT

In accordance with one or more aspects of the present invention, a wireless sensing system is disclosed, where the system has particular application to sensing the speed of a vehicle wheel, for example. To sense wheel speed, a sensing unit senses changes in magnetic flux and wirelessly relays a signal indicative thereof back to a base station or control unit.

9 Claims, 2 Drawing Sheets

US 7,408,452 B2

WIRELESS WHEEL SPEED SENSOR

FIELD OF INVENTION

The present invention relates generally to sensing circuitry, and more particularly to a wireless sensing unit suitable for use in an automobile to sense wheel speed.

BACKGROUND OF THE INVENTION

It can be appreciated that difficulties exist with regard to utilizing (e.g., positioning, associating and/or accessing) sensors in certain environments. In automotive applications, for example, sensors may be located in remote locations relative to a control unit. Such sensors may also be located in hard to reach places and/or harsh operating environments that are difficult to access, particularly after the vehicle is in operation. For example, sensors may be located in and/or on a tire to sense tire pressure, within a seat to sense seat position and/or the presence, absence and/or weight of a passenger in a seat, on an undercarriage or frame to sense a ride height of a vehicle, in a carburetor and/or engine to sense temperatures and/or pressures therein (e.g., of an accelerant such as gasoline), in a fluid compartment (e.g., gastank, oil pan, radiator, etc.) to sense fluid levels, etc.

Additionally, wiring along with associated wiring harnesses are generally utilized to carry output signals from the sensors and/or to supply operating power to such sensors. It can be appreciated that installing the sensors and making all the necessary wiring connections can be time consuming and labor intensive. Moreover, the physical connections can become overstressed and fail so that communications and/or electrical operations are interrupted. As such, it can be appreciated that there are an abundance of cost, reliability and/or safety issues that would make it desirable to facilitate wireless communications, particularly in automotive sensing applications.

SUMMARY OF THE INVENTION

The following presents a simplified summary of the invention in order to provide a basic understanding of some aspects of the invention. This summary is not an extensive overview of the invention. It is intended neither to identify key or critical elements of the invention nor to delineate the scope of the invention. Rather, its primary purpose is merely to present one or more concepts of the invention in a simplified form as a prelude to the more detailed description that is presented later. One or more aspects of the present invention are directed to a wireless sensor system that can facilitate wireless manipulation or control over one or more devices on an automobile.

In accordance with one or more aspects of the present invention, a wireless sensing system is disclosed, where the system has particular application to sensing the speed of a vehicle wheel, for example. To sense wheel speed, a sensing unit senses changes in magnetic flux and wirelessly relays a signal indicative thereof back to a base station or control unit.

To the accomplishment of the foregoing and related ends, the following description and annexed drawings set forth in detail certain illustrative aspects and implementations of the invention. These are indicative of but a few of the various ways in which one or more aspects of the present invention may be employed. Other aspects, advantages and novel features of the invention will become apparent from the following detailed description of the invention when considered in conjunction with the annexed drawings.

DETAILED DESCRIPTION OF THE INVENTION

Figure 1:
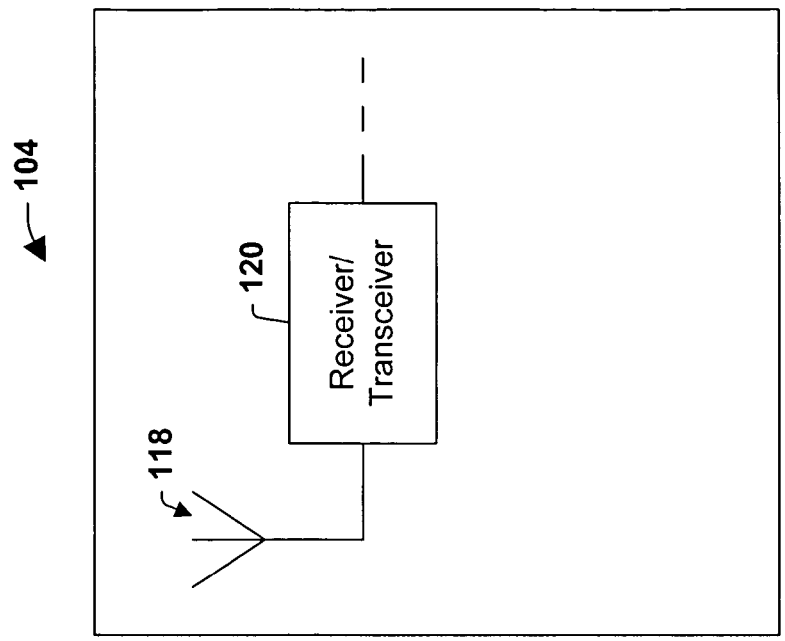
FIG. 1 is a system level block diagram illustrating a wireless sensor unit and an associated control module according to one or more aspects of the present invention.
Figure 1:
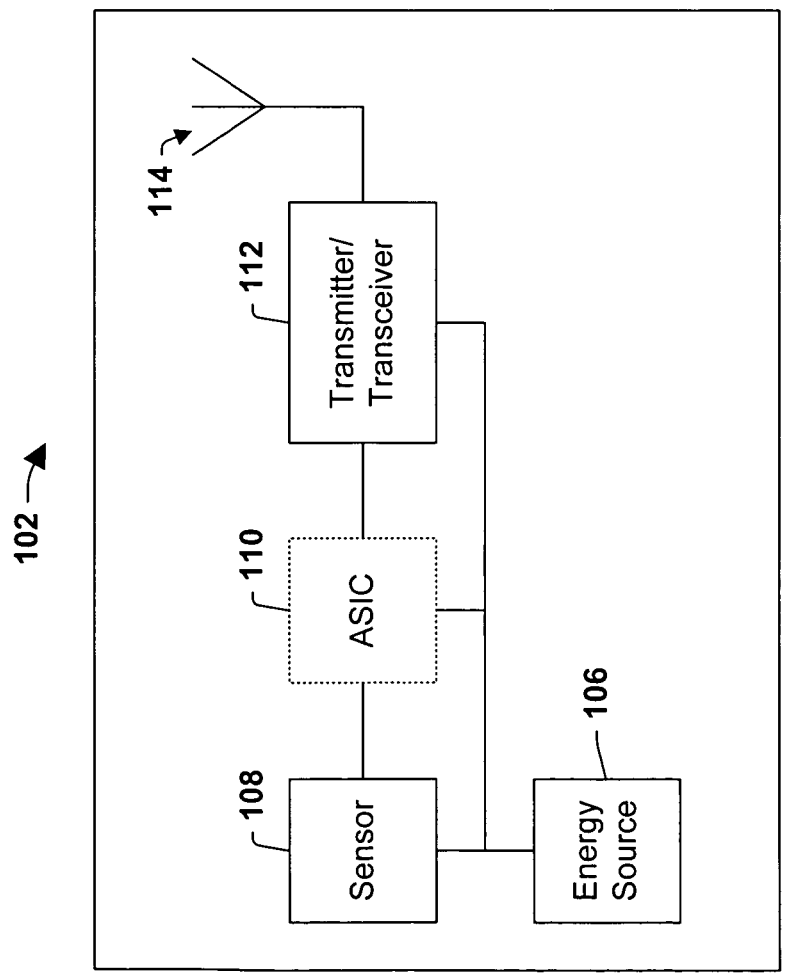

One or more aspects of the present invention are described with reference to the drawings, wherein like reference numerals are generally utilized to refer to like elements throughout, and wherein the various structures are not necessarily drawn to scale. It will be appreciated that where like acts, events, elements, layers, structures, etc. are reproduced, subsequent (redundant) discussions of the same may be omitted for the sake of brevity. In the following description, for purposes of explanation, numerous specific details are set forth in order to provide a thorough understanding of one or more aspects of the present invention. It may be evident, however, to one of ordinary skill in the art that one or more aspects of the present invention may be practiced with a lesser degree of these specific details. In other instances, known structures are shown in diagrammatic form in order to facilitate describing one or more aspects of the present invention.

FIG. 1 illustrates a wireless sensor component 102 and its operative association with an electronic control unit (ECU) component 104 according to one or more aspects of the present invention. The sensor component 102 comprises a battery or other type of energy or power source 106, which generally delivers relatively low power, such as from a low voltage (e.g., a few volt) supply, for example. A sensor 108 is operatively coupled to the power source 106 and to an application specific integrated circuit (ASIC) component 110, which is in turn operatively coupled to a UHF transmitter/transceiver component 112 and an associated antenna 114. In the illustrated example, the power source 106 is also operatively coupled to the ASIC 110 and transceiver 112 components to provide operating power thereto.

The sensor component 108 is configured to sense a particular condition, such as the speed of a rotating automotive wheel, for example. The ASIC component 110 thus receives one or more readings taken by the sensor 108 indicative of the sensed condition(s)—generally in the form of one or more signals from the sensor 108. The ASIC 110 processes or conditions the signals to yield a data signal or data gram therefrom, and forwards the same onto the transceiver component 112 for transmission thereby with the associated antenna 114 to an appropriate ECU component 104. The ASIC component 110 may also associate identification data, such as an address, etc., with the data gram or data packet. The identification data may be with regard to the particular sensor 108 from which the data originated and/or the condition(s) sensed by the sensor 108, such as the particular automotive wheel whose speed is being monitored, for example. In any event, the data may be transmitted by a failsafe transmission protocol, such as Manchester code, for example, to encrypt the data. With Manchester coding, for example, a clock signal is incorporated in the data being sent. The data is sent asynchronously and the clock frequency is extracted to read the data.

It will be appreciated that the ASIC component 110 is illustrated in phantom in FIG. 1 because some sensing arrangements in accordance with one or more aspects of the present invention may not require such a component. For example, where the sensor component 108, or an element thereof, is formed out of a semiconductor material, such as silicon, for example, and that material deflects or is otherwise physically manipulated or distressed in sensing an operating condition, for example, signal conditioning circuitry could be integrated into the semiconductor material. In this situation, the transceiver component 112 could be directly coupled to the sensor component 108, and any identification data may identify the individual data signal, which would still, of course, relate back to the condition being sensed. Additionally, it will be appreciated that the while an ASIC is depicted in the illustrated example, any suitable type of signal conditioning mechanism, such as a state machine and/or micro controller, for example, could be utilized to effect the same or a similar functionality according to one or more aspects of the present invention.

In the illustrated example, the ECU or control module component 104 comprises an antenna 118 associated with a UHF receiver/transceiver component 120 to facilitate receiving signals transmitted from the sensor component 102 and/or other components. It will be appreciated that the operating frequencies of the sensor 102 and control module 104 components, which generally operate in UHF, may be based upon a crystal reference and geographic region of operation.

Although not illustrated, it will be appreciated that the ECU component 104 generally comprises additional circuitry, such as an ASIC, state machine and/or micro controller component, for example, operatively coupled to the transceiver component 120 to decode and/or further process signals received thereby. For example, the ECU component 104 may thereby ascertain wheel speed for display to a user and/or for use in controlling certain vehicle systems and/or operations, for example. By way of example, since the ECU component 104 and the sensor component 102 may both comprise transceiver components, the ECU component 104 can send a control signal to the sensor unit 102 to regulate the operation thereof, such as in response to a reading taken by the sensor component 102, for example. Where the sensor component 102 senses zero speed for a predefined period of time, for example, the ECU component 104 can send a control signal to the sensor component 102 instructing the sensor component 102 to run a self diagnostic to see if the sensor component 102 is operating properly. If, in return, the ECU component 104 receives a signal indicating that the sensor component 102 is operating properly, the ECU component 104 can then instruct the sensor component 102 to go into a sleep mode to conserve (battery) power since the vehicle may be stopped. For example, the engine of the vehicle may still be running to keep the occupants of the vehicle warm, for example, but the vehicle may not be moving.

It will be appreciated that multiple sensor components 102 and multiple control module components 104 may be operated within range of one another in certain applications, such as in sensing the speed of multiple wheels on an automobile, for example. In this situation, the multiple sensor components 102 and/or control module components 104 can be outfitted with respective identification mechanisms, such as address generation and/or encoding circuitry, for example. Such circuitry may be comprised within state machine, micro controller and/or ASIC components, for example, so that particular sensor components 102 and control module components 104 have to "match up" before certain communications and/or actions can take place.

By way of example, four different sensor components 102 can be utilized to sense the respective speeds of the four different wheels of an automobile. As such, the sensors each broadcast within range of one or more control module components 104. Associating identification data with the sensor components 102 and/or the control module components 104 allows the speed of each individual wheel to be determined. This may allow a control module 104 to determine, for example, whether the car is making a turn. For example, where the two driver side wheels are rotating faster than the two passenger side wheels, the control module 104 may deduce that the vehicle is making a right hand turn. Further, the relative speed of the driver side wheels to the passenger side wheels may provide an indication as to how sharp of a turn the vehicle is making, where a sharper turn (e.g., that has a smaller radius) will cause the outside wheels to rotate faster than the inside wheels. This information can be used to automatically stiffen pneumatic shocks, for example, on the driver side of the vehicle to deter a roll over condition. The same is true with regard to a left hand turn, where the passenger side wheels would rotate faster than the driver side wheels.

Figure 2:
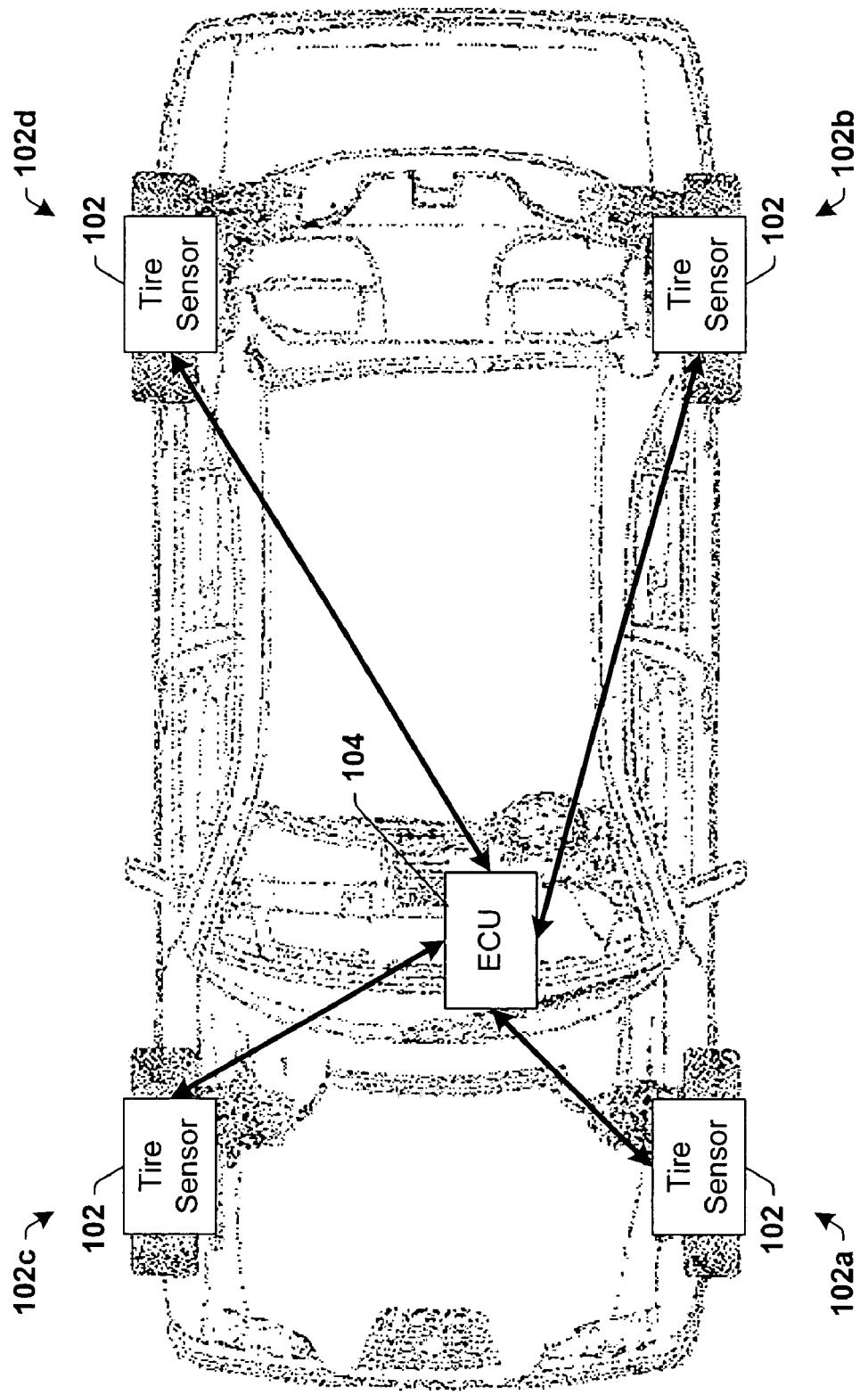
FIG. 2 is a plan view of a vehicle illustrating one or more automotive applications for a sensor unit according to one or more aspects of the present invention.

Turning to FIG. 2, an implementation of one or more sensor components 102 and a control module component 104 in a vehicle is illustrated according to one or more aspects of the present invention. In the illustrated example, respective sensor components 102, such as that illustrated in FIG. 1, are operatively associated with the driver side front 102a, driver side rear 102b, passenger side front 102c and passenger side rear 102d wheels of a motor vehicle 150, and a control module component or ECU 104 is more centrally located within the vehicle 150, such as in the dash board of the vehicle 150, for example.

The sensor components 102 can sense the respective speeds of the wheels by sensing changes in magnetic flux, for example. More particularly, respective sensors 108 (FIG. 1) of the sensor components 102 can be situated on the vehicle chassis near bearings of the wheels 102a, 102b, 102c, 102d. Magnetic encoders can be located on the wheels so that the sensors 108 can sense a change in magnetic flux as the as the wheels and thus the magnetic encoders rotate. Certain magnetic signal characteristics can correspond to rotational speed. For example, sine waves may be indicative of rotational wheel speeds. The sensed magnetic flux and changes thereto are converted to respective data signals by conditioning circuitry 110 in the sensing units 102. The respective data signals are wirelessly relayed by transceivers 112 and associated antennas 114 to the control module 104 according to one or more aspects of the present invention.

It will be appreciated that implementing such a wireless communication and/or control system in automotive applications has numerous advantageous. For example, wiring and/or wiring harnesses are generally required to provide power and a path for signals used for communication, sensing and/or actuations in automotive applications. This can be expensive and labor intensive to install, particularly where the wiring has to be routed through hard to reach places. Accordingly, reducing the amount of wiring necessary in a vehicle, as provided for by one or more aspects of the present invention, is an attractive prospect since it can reduce costs associated with producing, operating and maintaining vehicles. For example, in addition to reducing the costs of raw materials necessary for producing a vehicle, reducing the amount of wiring in the vehicle can lighten the vehicle, which translates into fuel savings. Similarly, designing a vehicle is made easier and less constrained since little to no consideration has to be given to the placement and/or routing of wiring and harnesses. Additionally, sensor 102 and control module 104 components (and subcomponents thereof) described herein can be integrated into vehicles as modular components that can be easily and inexpensively swapped into and out of vehicles (e.g., where they become outdated and/or fail to operate as desired). Accordingly, outfitting a vehicle with one or more sensor 102 and control module 104 components as described herein leads to a safer and more economical vehicle that is, easier and less costly to operate and maintain.

Although the invention has been shown and described with respect to one or more implementations, equivalent alterations and modifications will occur to others skilled in the art based upon a reading and understanding of this specification and the annexed drawings. The invention includes all such modifications and alterations. With regard to the various functions performed by the above described components (assemblies, devices, circuits, etc.), the terms (including reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising." Also, the term "exemplary" as utilized herein merely means an example, rather than the best.

What is claimed is:

1. A sensing system configured to sense the speed of wheels of a motor vehicle, comprising:
    two or more sensors configured to provide respective readings indicative of the speed of two or more wheels of the motor vehicle;
    conditioning circuitry operatively coupled to the sensors, respectively, and configured to condition the readings taken by the sensors into respective data grams indicative of the speeds of the wheels and to associate identification data with the data grams indicative of the particular wheels whose speeds are being sensed;
    transceivers operatively coupled to the conditioning circuitry, respectively, and configured to wirelessly transmit the data grams; and
    a control module component configured to receive the data grams and to assess therefrom a vehicle rollover condition.

2. The system of claim 1, the control module component configured to further utilizes the data grams to deter a roll over condition.

3. The system of claim 2, where the control module component comprises:
    a transceiver configured to receive wireless transmissions from the sensor components, and to transmit control signals therefrom.

4. The system of claim 1, where the sensors sense the speed of the wheels by sensing changes in magnetic flux.

5. The system of claim 3, the sensor configured to regulate the stiffness of one or more shocks to mitigate a roll over condition.

6. The system of claim 1, the control module component configured to cause one or more wheel sensor components to run a self diagnostic after one or more corresponding wheels have not rotated for a predefined period of time, and to cause the one or more wheel sensor components to enter a power conservation mode if the self diagnostic reveals no defects in the operation of the one or more sensor components.

7. A sensing system configured to sense the speed of one or more wheels of a motor vehicle, comprising:
    one or more sensors configured to provide respective readings indicative of the speed of one or more wheels of the motor vehicle;
    conditioning circuitry operatively coupled to the sensors, respectively, and configured to condition the readings taken by the sensors into respective data grams indicative of the speeds of the wheels and to associate identification data with the data grams indicative of the particular wheels whose speeds are being sensed;
    one or more transceivers operatively coupled to the conditioning circuitry, respectively, and configured to wirelessly transmit the data grams; and
    a control module component configured to receive the data grams, the control module comprising a transceiver and configured to cause one or more wheel sensor components to run a self diagnostic after one or more corresponding wheels have not rotated for a predefined period of time, and to cause the one or more wheel sensor components to enter a power conservation mode if the self diagnostic reveals no defects in the operation of the one or more sensor components.

8. A method of sensing the speed of wheels of a motor vehicle, comprising:
    obtaining readings indicative of the speed of two or more wheels of the motor vehicle;
    conditioning the readings into respective data grams indicative of the speeds of the wheels;
    associating identification data with the data grams indicative of the particular wheels whose speeds are being sensed;
    wirelessly transmitting the data grams to a control module; and
    assessing a rollover condition from the data grams.

9. A method of sensing the speed of one or more wheels of a motor vehicle, comprising:
    obtaining readings indicative of the speed of one or more wheels of the motor vehicle with one or more sensors;
    conditioning the readings into respective data grams indicative of the speeds of the wheels;
    associating identification data with the data grams indicative of the particular wheels whose speeds are being sensed;
    wirelessly transmitting the data grams to a control module; and
    wirelessly transmitting from the control module to one or more sensors a command for the sensors to run a self diagnostic after corresponding wheels are not rotated for a predefined period of time and causing the sensors to enter a power conservation mode if the self diagnostic reveals no defects in the operation of the sensor components.

* * * * *